US009613080B1

(12) United States Patent
Kowalski

(10) Patent No.: US 9,613,080 B1
(45) Date of Patent: Apr. 4, 2017

(54) DATABASE COST TRACING AND ANALYSIS

(71) Applicant: Amazon Technologies, Inc., Seattle, WA (US)

(72) Inventor: Marcin Piotr Kowalski, Capetown (ZA)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/968,811

(22) Filed: Dec. 14, 2015

Related U.S. Application Data

(62) Division of application No. 13/862,934, filed on Apr. 15, 2013, now Pat. No. 9,213,726.

(51) Int. Cl.
*G06F 17/30* (2006.01)

(52) U.S. Cl.
CPC .. *G06F 17/30371* (2013.01); *G06F 17/30389* (2013.01); *G06F 17/30477* (2013.01); *G06F 17/30867* (2013.01)

(58) Field of Classification Search
CPC .............. G06F 17/30; G06F 17/30474; G06F 17/30371; G06F 17/30867; G06F 17/30389; G06F 17/30447

USPC .................................... 707/600–899
See application file for complete search history.

(56) References Cited

U.S. PATENT DOCUMENTS

| 7,707,173 | B2 | 4/2010 | Nanavati et al. |
| 8,640,149 | B2 | 1/2014 | Liu et al. |
| 8,762,367 | B2 | 6/2014 | Burger et al. |
| 2012/0155296 | A1 | 6/2012 | Kashanian |
| 2013/0086039 | A1 | 4/2013 | Salch et al. |
| 2014/0068639 | A1* | 3/2014 | Schrock ..................... G06F 9/54 719/328 |

* cited by examiner

*Primary Examiner* — Isaac M Woo
(74) *Attorney, Agent, or Firm* — Baker & Hostetler LLP

(57) ABSTRACT

Web services hosted at a data center may employ architectural patterns that tend to obfuscate the source of queries made against databases and other resources in the data center. The queries may be the source of performance, capacity or utilization problems, and may contribute to the cost of hosting the web service. Web service invocations may be associated with identifiers that can be included in modified queries sent to databases and other resources. Summarized cost information may be calculated based on recorded associations between the identifiers and query performance information.

20 Claims, 12 Drawing Sheets

| | process id | query text | CPU | elapsed time |
|---|---|---|---|---|
| 212 | 2445 | select * from t1 | 0.50% | 5435ms |
| 214 | 2345 | select col1 from t1 where x=? | 2.3% | 245ms |
| 216 | 5435 | select * from t2 | 4.75% | 7560ms |
| 218 | 6545 | select * from t1 | 0.50% | 231ms |
| 220 | 5499 | select * from t1 where x=2 | 2.8% | 4521ms | cost information table 202

FIG. 2

| customer identifer | API | invocation identifier | CPU | elapsed time |
|---|---|---|---|---|
| 10002 | getSalesData | AB0012F | 0.50% | 5435ms |
| 52113 | applyDiscount | FB2298 | 2.3% | 245ms |
| 10002 | getSalesData | AB0012F | 4.75% | 7560ms | contextualized cost table 550

FIG. 5B

DATABASE COST TRACING AND ANALYSIS

CROSS-REFERENCE TO RELATED APPLICATION

This application is a divisional of U.S. patent application Ser. No. 13/862,934, filed Apr. 15, 2013, the entirety of which is incorporated herein by reference.

BACKGROUND

Web services and other network-based applications may be employed to store and retrieve data on behalf of numerous users. In some cases, use of the service may be exchanged for a fee. In other cases, a customer may contract with a third party to host a service on behalf of the customer's users. However, the architecture of these services may be complex, and accordingly the cost of providing the service might be difficult to calculate. The problem may be more difficult when multiple services are hosted within a single computing environment.

A related issue involves the complexity of diagnosing database performance problems. Web services and similar applications may employ one or more databases to store and retrieve data. When a web service interface is invoked, the invocation may result in a number of additional nested calls to various computing resources. Each of these may, in turn, send a request to one or more databases. When one of these queries causes a performance problem, it may be difficult to trace the query to its original source.

BRIEF DESCRIPTION OF DRAWINGS

The drawings provided herein are designed to illustrate example embodiments and are not intended to limit the scope of the disclosure.

FIG. 2 is a diagram depicting performance information for queries that have executed or are executing on a database management system.

FIG. 5B is a diagram depicting an example of a contextualized cost table associating the cost of processing a query with the context of the API that originated the query.

DETAILED DESCRIPTION

There are a variety of mechanisms for remotely invoking functionality on a computing device. In one example, a web service provides a mechanism for providing various types of functionality over a remote connection such as the Internet, an intranet, or other network connections. A web service may, for example, provide an application programming interface ("API") to multiple client applications using representation state transfer ("REST") or other approaches. In some cases, the number of clients accessing the server may number in the hundreds, thousands or millions.

When an individual client invokes the web service, various additional request levels may be generated. As one example, a web service invocation might need to query a database in order to retrieve data necessary to perform the functions of the web service, such as retrieving the user's shopping cart contents. The database employed may be any of numerous types of database management systems, such as key-value databases, object-oriented databases, relational databases and so forth. In cases such as this, the web service may make large numbers of database queries on behalf of many different users. As used herein, the term query may apply to any request or command made to a database management system, web service, business object, library, code module and so forth.

In addition to making database queries, the web service might invoke additional levels of web services, business objects or other code layers. These may all, in turn, make additional database requests or invoke deeper levels of executing code. Accordingly, the database workload may be difficult to analyze because the sources of the workload are obfuscated.

Figure 1:
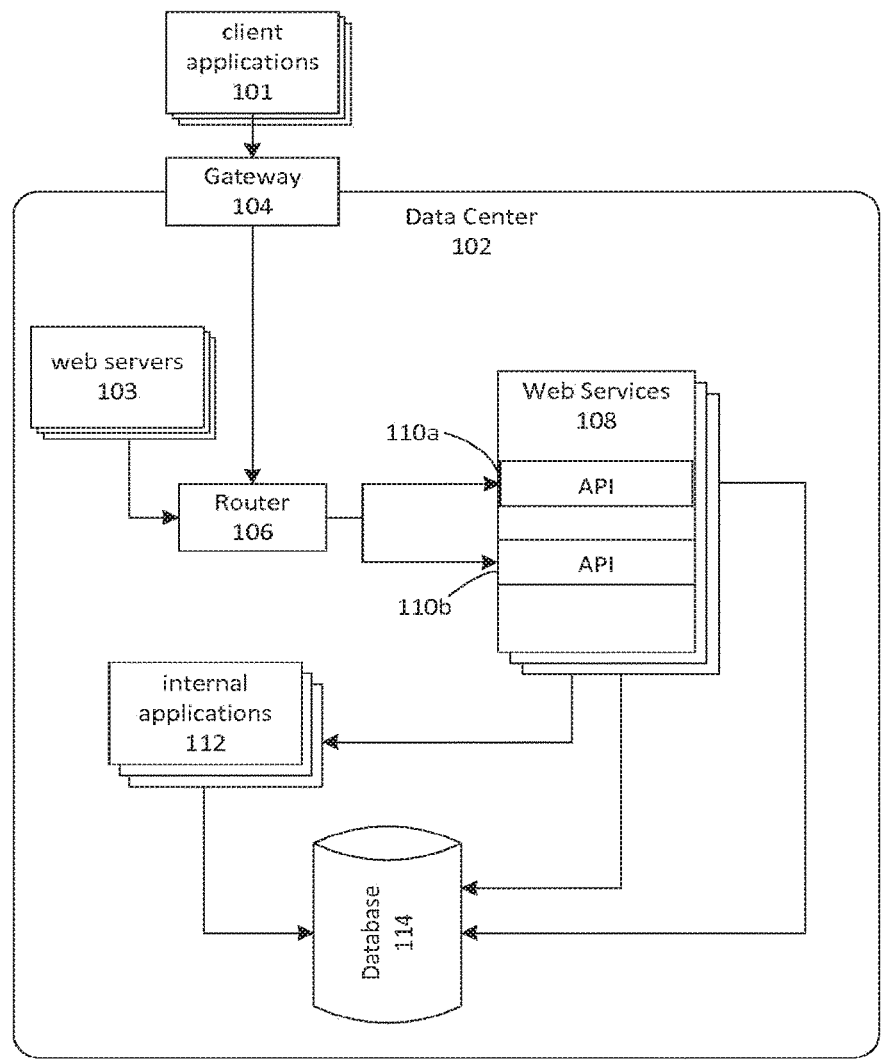
FIG. 1 is a block diagram depicting an architectural pattern tending to lead to obfuscation of the source of workload imposed upon a database.

FIG. 1 is a block diagram depicting an architectural pattern tending to lead to database workload obfuscation. Data center 102 may host various services such as web services 108. Various clients applications 101 may access web services 108 through gateway 104 and router 106. Various web servers 103 may also access web services 108 through router 106. Those of ordinary skill in the art will recognize that the depicted network architecture is illustrative of general concepts, and that many alternative architectures and elements may be employed.

Client applications 101, web servers 103 and other processes may access various application programming interfaces ("APIs") of web services 108, including APIs 110a and 110b. Execution of code associated with web services 108, including APIs 110a and 110b, may result in queries and requests directed to database 114. In some embodiments, execution of code associated with web services 108 may also direct requests to internal applications 112, which may in turn direct requests to database 114. Internal applications 112 may make queries or requests on their own behalf, or on the behalf of one or more web services 108 and APIs, such as 110a and 110b.

The architectural pattern depicted in FIG. 1 may be found in numerous other situations, such as web sites, web applications, client-server applications and so forth. In general, all of these may involve clients making a request that, in order to be fulfilled, results in multiple numbers of database calls, made either directly or indirectly. This pattern tends to obfuscate the source and nature of the events that drive database load. Accordingly, it may be difficult to evaluate the performance impact that any given web service invocation has upon the database.

Operational support may also be difficult in these circumstances. Operational support may for example include provisioning, configuration, fault management, pricing determinations and so forth. One example, among many, involves determining the cost of a web service API invocation and comparing it to a provisioned level of service, so that a given customer does not exceed the level of service he has paid for. In another example, certain invocations of a web service API might result in database queries that unacceptably degrade performance or cause faults to occur.

Application tracing mechanisms may be employed to generate and record information about executing code, such as the executing code associated with a web service API implementation. These mechanisms may produce various trace files containing entries, in chronological order, describing the path of execution for particular invocations of the web service API. The contents of these trace files may be limited to the code that executed during a particular invocation of the web service API.

Trace files of this type may contain records of requests or queries sent to one or more databases. However, there are a number of obstacles to using this information for diagnosing database utilization or capacity problems. First, the trace files may not contain information describing the impact of any particular query or request on the database, because the executing web service code may not have ready access to this information. Second, the trace file may only pertain to a particular invocation of the web service, or to multiple invocations performed over time. It may be difficult to coalesce this information into comprehensible data pertaining to database workload. Third, it may be difficult to trace the sequence of calls from the originating web service API invocation to the code that actually issued the database request or query. This may be due to a variety of reasons, including the potential for layered invocations to web service APIs and other executable code prior to the point at which the database request was issued. For all of these reasons, trace files are not ideal for diagnosing database utilization or capacity issues.

Database management systems may be configured to provide various diagnostic facilities for performing analysis of performance, utilization, capacity, throughput and so forth. One such facility involves a list of currently executing requests or queries, which may also provide various performance metrics as well as a textual representation of the executing query. FIG. 2 depicts an example which may be applied to aspects of the present disclosure. Table 202 is intended to illustrate information that may be obtained from a database management system that is representative of current or historical workload. Those of ordinary skill in the art will appreciate that table 202 is intended to be illustrative of available performance information and should not be read to limit the scope of the present disclosure.

The information provided by the diagnostic facilities may be described as cost metrics. A cost metric may reflect monetary value, impact on performance, capacity, throughput utilization or various other measures such as raw statistical values. These metrics may be collected from database diagnostic facilities and used to determine or monitor the costs associated with operating a database. For example, a measure of network bandwidth usage might be extrapolated to a monetary value corresponding to investment in network infrastructure. Similarly, disk utilization values might be extracted to a monetary value related to purchasing and operating additional storage. A monetary value might also be based on opportunity cost incurred when database performance, capacity, utilization and so forth is overused or under used. Based on various extrapolations, monetary costs may be allocated to a customer based on the customer's impact on the database.

The values contained in column 204 represent process identifiers associated with queries that have executed or currently are executing on the database management system. A process identifier is generally associated with an instance of an executing program. For example, ten running instances of the same executable program file may have ten distinct values as process identifiers. These values may be assigned by the operating system. In some embodiments, a web service, web server, application program and so forth may issue various database requests from within a single instance. Accordingly, the process identifier may not be useful in determining the true source of database utilization or capacity issues.

The values contained in column 206 represent the text of the executing query. In some embodiments, the text may contain references to parameters, the values of which may also be available from various diagnostic facilities.

Columns 208 and 210 are illustrative of performance information, or more generally cost information, pertaining to the execution of the associated query text. For example, row 212 indicates that a process identifier with a value of "2445" issued a query whose text consisted of "select*from t1," whose execution involved reaching 0.50% CPU utilization and took 5435 milliseconds.

Performance information of the type depicted in FIG. 2 may be written to a log file on a periodic basis. In some embodiments, all such available data may be recorded. In other embodiments, queries or requests having performance impact above a threshold level may be written to a log file, such that each entry in the log file is a candidate for further analysis of its impact on performance, utilization or capacity.

The performance information just described may be useful to optimize queries, but on its own may not be useful to correlate between web service invocations and database workload. For example, the information available in row 214 does not necessarily correlate to any particular invocation of a web service API, because each invocation may involve issuing the same database query. In some cases, performance metrics such as those depicted in columns 208 and 210 may be averages across multiple invocations of the same query. When that is the case, correlating between web service invocations and database workload may be difficult because the provided metrics may be summaries or averages across multiple executions of the same query.

The various trace logs and diagnostic information described herein may be helpful for certain tasks, but may not be optimal for tracing a chain of events that led to a negative impact on database performance, utilization or capacity. Furthermore, various applications may be enabled by a more readily derivable assessment of the impact of a web service API invocation on database performance. For example, it may be desired to provision a given customer with a predefined share of a database's capacity or throughput capability. Provisioning mechanisms such as this may achieve greater precision if they can incorporate information concerning an API's impact on performance.

Figure 3:
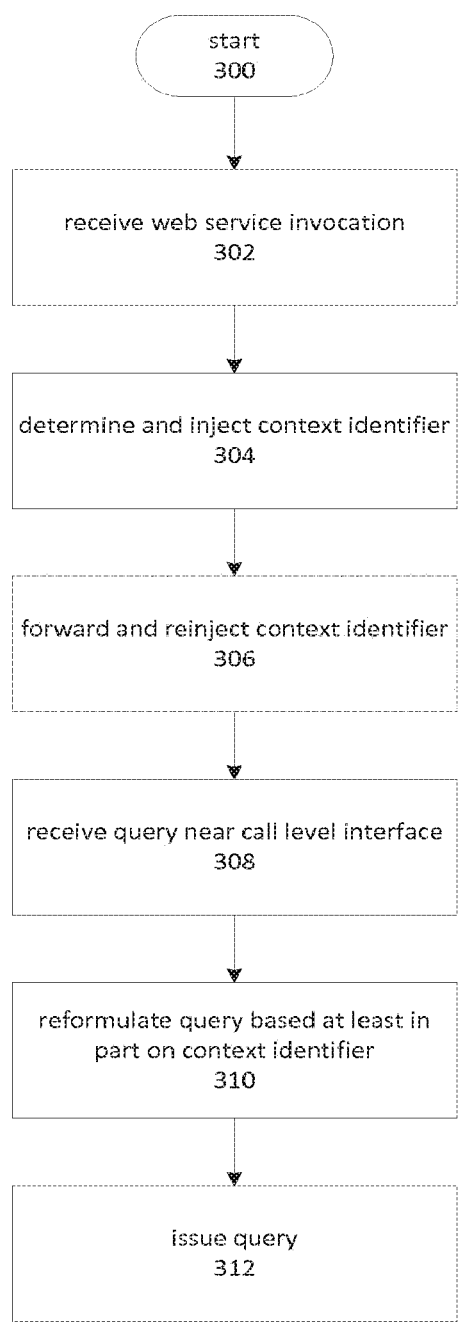
FIG. 3 is a flowchart depicting an embodiment for reformulating queries to include contextual information.

The diagnostic and performance information described herein, which may be referred to as cost information, could be made more useful if it could be associated with a web service invocation that initiated a chain of events leading to an expensive database query. FIG. 3 is a flowchart depicting an embodiment that reformulates a SQL query based on a web service invocation context. The operations depicted in FIG. 3 are illustrative and should not be construed as limiting the scope of the present disclosure. Some of the depicted operations may, for example, be combined, reordered, modified or performed in parallel.

At operation 302, a web service invocation is received from a client application. The invocation may be associated with various pieces of contextual information identifying the client application and the context in which the invocation is being made. For example, a client application might invoke a "purchase product" web service API. A customer identifier might be included in the invocation, or be derivable from other information such as the internet protocol address from which the request originated. The invocation might also include parameters for the request, such as an order identifier, product identifier, quantity and purchase price. In addition, the invocation might contain an identifier unique to the particular invocation, such as a globally unique identifier ("GUID"). It may be advantageous for the GUID to be generated by the web service API code, rather than being included in the request.

At operation 304, the context information provided in the invocation may be determined at least in part by examining request headers, API parameters and so forth. A globally unique identifier might also be generated. Once determined, this information may be associated with the web service API's path of execution. This may be done using various mechanisms, such as thread local storage ("TLS"). This approach allows contextual information to be available to subsequent layers of execution. A TLS record may be employed to identify the originating client, a GUID identifying the particular invocation and so forth. It may be advantageous to perform the injection of contextual information at the earliest opportunity. This may be done as one of the earliest actions taken subsequent to the invocation of the web service API.

There may be cases were a web service API is invoked as part of a chain of events following a web service API invocation. This may be the case even for client-facing web services. Accordingly, it may be advantageous to forward and re-inject contextual information, as depicted by optional operation 306. This may involve extracting the contextual information from thread local storage, packaging it, and forwarding the information to the subsequent web service invocation.

If a web service API may be invoked from multiple sources, some of those sources may provide packaged contextual information, while others, such as clients making initial invocations of a web service API, may not include pre-packaged information. Accordingly, it may be advantageous to detect the presence of pre-packaged contextual information and use the pre-packaged information when it is available. By extracting the pre-packaged contextual information and re-injecting it into thread local storage, the original invocation context may be preserved.

At operation 308, a database query or request is received at or near an invocation of a call level interface ("CLI") method. A CLI may be described as a software layer providing interfaces used to directly invoke database functionality. A CLI may, for example, be invoked to issue a query to a database. Various non-limiting examples include Open Database Connectivity ("ODBC") interfaces, JAVA Database Connectivity ("JDBC") and so forth. Operations 310 and 312 may be performed at or near the CLI call. It may be advantageous to modify the CLI call directly, or to route all code through wrapper interfaces. This approach may prevent the thread of execution from inadvertently bypassing operations 310 and 312. In other embodiments, the operations may be performed at code levels above the CLI call, such as in a business object layer, database abstraction layer or other code module.

At operation 310, the query issued or about to be issued to the CLI call may be reformulated. The reformulation may be based at least in part on the contextual information placed in thread local storage. In general terms, the reformulated query may include desired pieces of contextual information. This may include an identifier of the client who invoked the originating web service API call. It may also be advantageous to include a GUID identifying the particular invocation. Numerous additional combinations are possible. Reformulating a query may comprise replacing, editing or appending data to the existing query. In other embodiments, the query may be copied and then updated. Some embodiments may deconstruct the query into constituent parts and create a new query with new elements inserted. The reformulated query is constructed so that execution of the reformulated query produces a result that is logically equivalent to the original query, or produces a result that includes a logically equivalent result. Each of these cases involves a reformulated query that produces results equivalent to the original query.

At operation 312, the reformulated query may be issued. After processing by the CLI, the query is received and processed by a database management system. The query, having been reformulated in a manner that does not substantially affect its execution, may be processed by the database engine and monitored using various diagnostic facilities providing information such as that depicted by FIG. 2. The reformulated query may include contextual information, such as a client identifier, and accordingly this information may be visible in the output of the diagnostic facility.

Figure 4:
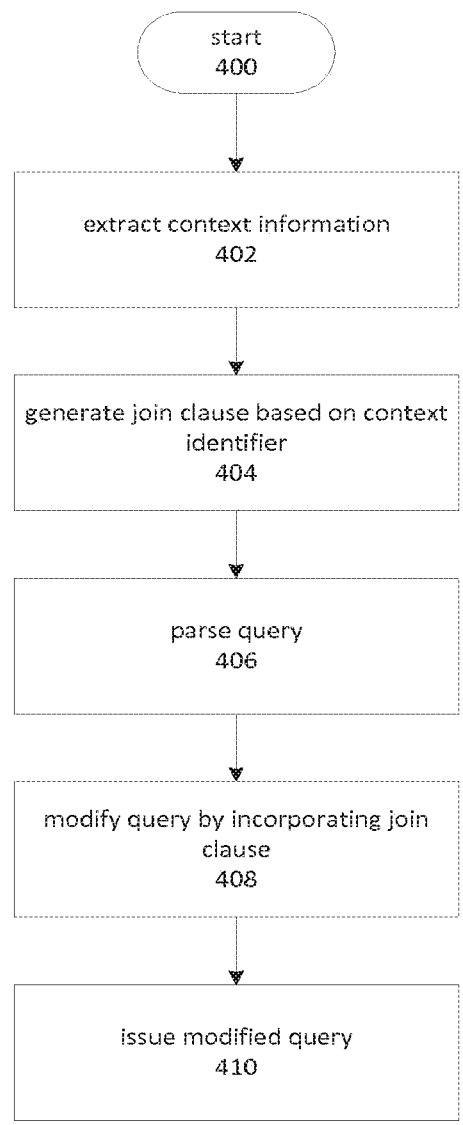
FIG. 4 is a flowchart depicting an example of a method for reformulating a relational database query to include contextual information.

FIG. 4 depicts an embodiment for reformulating the query to include contextual information. The query may be reformulated in a manner that neither substantially affects the results produced by executing the query nor substantially affects the queries optimization and execution. Those of ordinary skill in the art will appreciate that FIG. 4 is illustrative in nature and that the depicted operations may be modified, omitted, rearranged or performed in parallel.

An advantage associated with direct modification of the query statement is that the contextual information becomes part of the statement. Elements that are passed with the query but are not part of the query statement itself may be separated from the query statement as it is processed, and thus may not be visible to various analysis tools. For example, a comment, pragma, message statement or other element might not be retained if the query is prepared in advance of execution, or is embedded in a stored procedure. However, contextual information may be retained in such circumstances if it is part of the query statement.

As depicted by operation 402, one or more pieces of contextual information may be obtained for a thread of execution performing a function of the invoked web service API. This may be done, for example, by obtaining the contextual information from thread local storage, where it was stored upon invocation of the web service. From this information, a subset may be chosen for direct representation within the reformulated query.

Figure 4B:
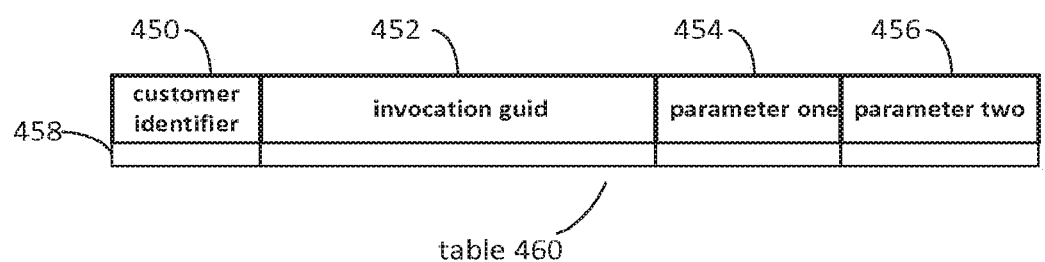
FIG. 4B is a diagram depicting an empty table that may be used in conjunction with a join clause to include contextual information in a reformulated query.

One possible approach to reformulating the query is depicted by operation 404. A join clause may be generated with a table whose defined columns comprise informational categories chosen for inclusion in the reformulated query. FIG. 4B depicts one of many possible embodiments for such a table. Column 450 may represent a customer identifier corresponding to the customer invoking the web service API. Column 452 may represent a GUID uniquely identifying the particular invocation. Columns 454 and 456 might represent parameters supplied to the Web Service API upon invocation.

Row 458 in FIG. 4B is depicted as empty to indicate that although table 460 is defined by a column schema, it is an empty table. Accordingly, an outer join between the results of the original query and empty table 460 would neither substantially affect the results of executing the query nor substantially affect its optimization or execution performance.

Returning to FIG. 4, operations 406 depict parsing the query to analyze its structure, leading to operation 408 which involves reformulating the query to include an outer join on a table such as table 460 depicted in FIG. 4B. In some embodiments, it may be advantageous to tokenize and generate a tree-based representation of the SQL query. Those of ordinary skill in the art will recognize that many alternative embodiments are possible.

The query may be modified to incorporate the join clause at operation 408. This may be done, for example, by inserting the join clause into the tree-based representation of the of the SQL query, followed by a traversal operation to form a textual representation of the reformulated query. Once the reformulated query has been converted to text, it may be issued via the CLI, as depicted by operation 410.

Figure 4C:
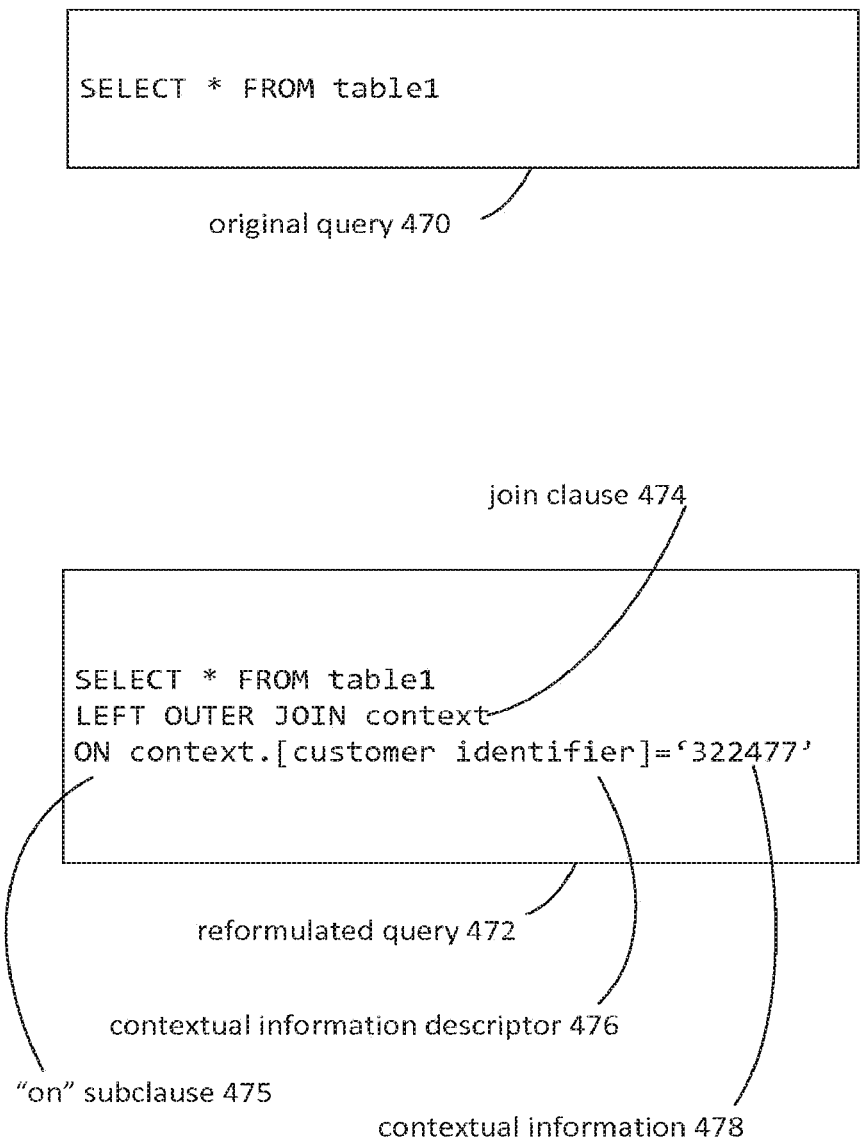
FIG. 4C is a diagram depicting an original query and a reformulated query that includes contextual information in a join clause.

An example of an original query and a corresponding reformulated query is depicted in FIG. 4C. Original query 470 refers to a table named "table1." Reformulated query 472 contains contextual information referencing the chain of events that led to the database query being issued, without substantially modifying the optimization, performance or results of original query 470. Join clause 474 refers to an empty table, such as table 460 depicted in FIG. 4B. The "on" subclause 475 may be written to include contextual information 478 and a description of the contextual information 476. For example, contextual information 478 might refer to an identifier of the customer who invoked the web service API. Because join clause 474 joins to an empty table, the optimization, performance and results of reformulated query 472 are substantially similar to original query 470.

In an embodiment, the position of the contextual information within the query may be used to infer the identity or meaning of contextual information, rather than a descriptor such as contextual information descriptor 476. In such embodiments, the left-hand side of the comparisons in the statement becomes unimportant to determining the meaning of the right-hand side. Accordingly, the empty table may be defined as only containing a single value.

Figure 4D:
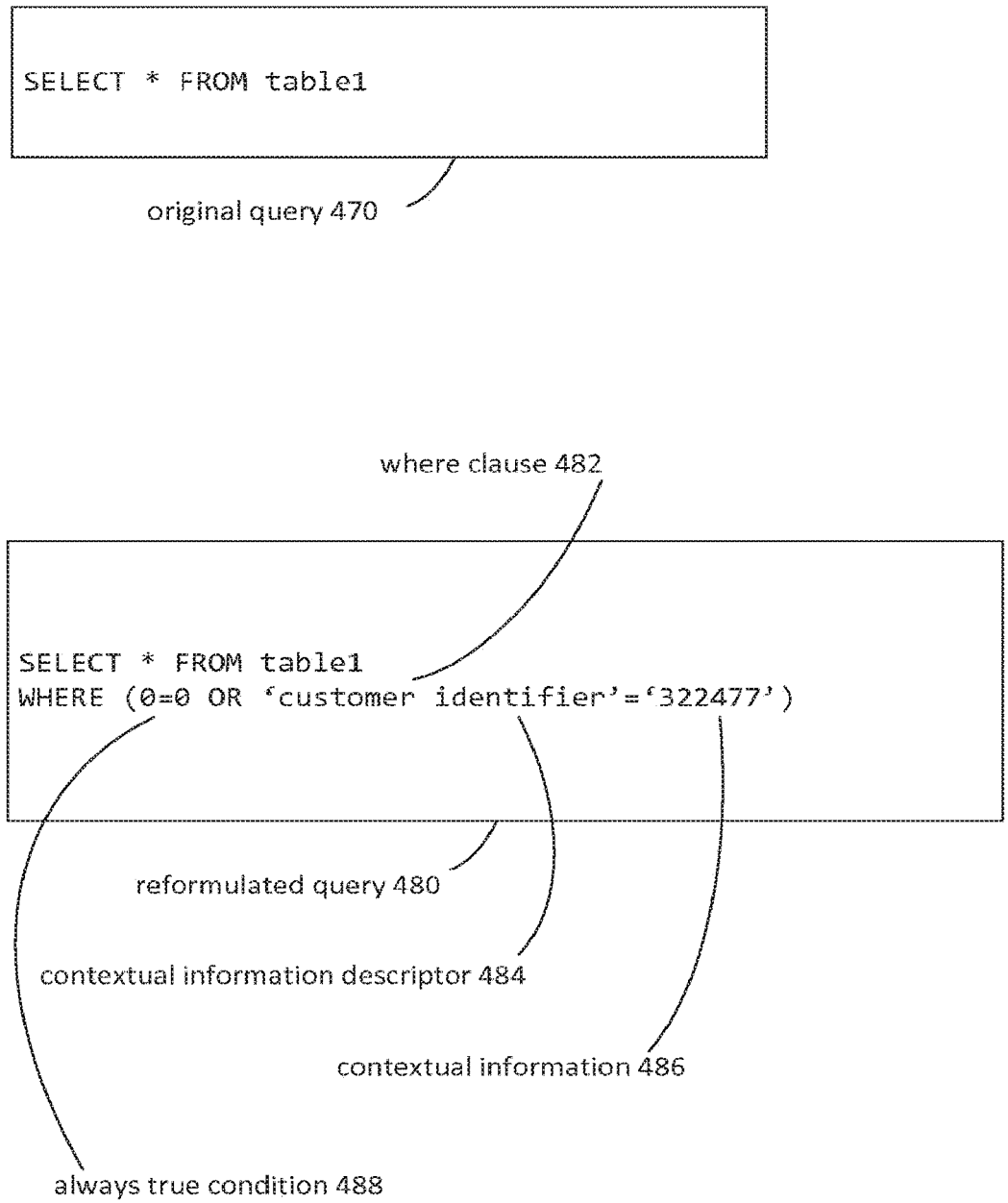
FIG. 4D is a diagram depicting an original query and a reformulated query that includes contextual information using a where clause.

Various other approaches may be employed to generate queries that include contextual information. FIG. 4D depicts one such approach. Reformulated query 480 may be formed from original query 470 and where clause 482. A list of conditions may be specified in where clause 482, joined by one or more 'OR' logical operators. One of the specified conditions may be structured to always evaluate to true, such as condition 488. The subsequent conditions may comprise one or more pieces of contextual information 486 and corresponding descriptors 484, each condition joined by an 'OR' logical operator. It may be desirable to position always true condition 488 according to the expected order of evaluation, so evaluation of subsequent conditions may be bypassed. In some cases, the query optimizer may effectively remove the list of conditions from the execution plan, because it always evaluates to true and accordingly has no substantial effect on query execution.

In some cases, an original query may comprise a where clause having conditions that must be evaluated. The effect of these conditions may be preserved in the reformulated query by joining the list of conditions in the original where clause with the list of conditions just described. This may be done by joining the two lists with the 'AND' logical operator and using appropriate precedential indicators, such as parentheses.

Numerous additional embodiments may reformulate queries to contain contextual information. In various embodiments, the reformulated query may include a stored procedure invocation, with desired contextual information passed as parameters. The stored procedure may evaluate to a no-op, or it may comprise taking additional steps such as recording the contextual information in a specialized table. Another possible approach involves inserting comments, syntax elements or API elements for associating inoperative or uninterpreted information with the query. However, when used with some database management systems, comments or other uninterpreted elements may not be compatible with prepared statements or stored procedure calls. In an embodiment, the database management system may be extended to allow for these elements to be associated with the invocation of a previously prepared query statement or previously created stored procedure.

Key-value databases, or similar database management systems that do not employ query languages, may be extended to allow for the contextual information to be provided. In an embodiment, a key-value database management system is extended to allow for contextual information to be associated with key-value queries using extensions to a call level API or extensions to a query language syntax that.

Figure 5:
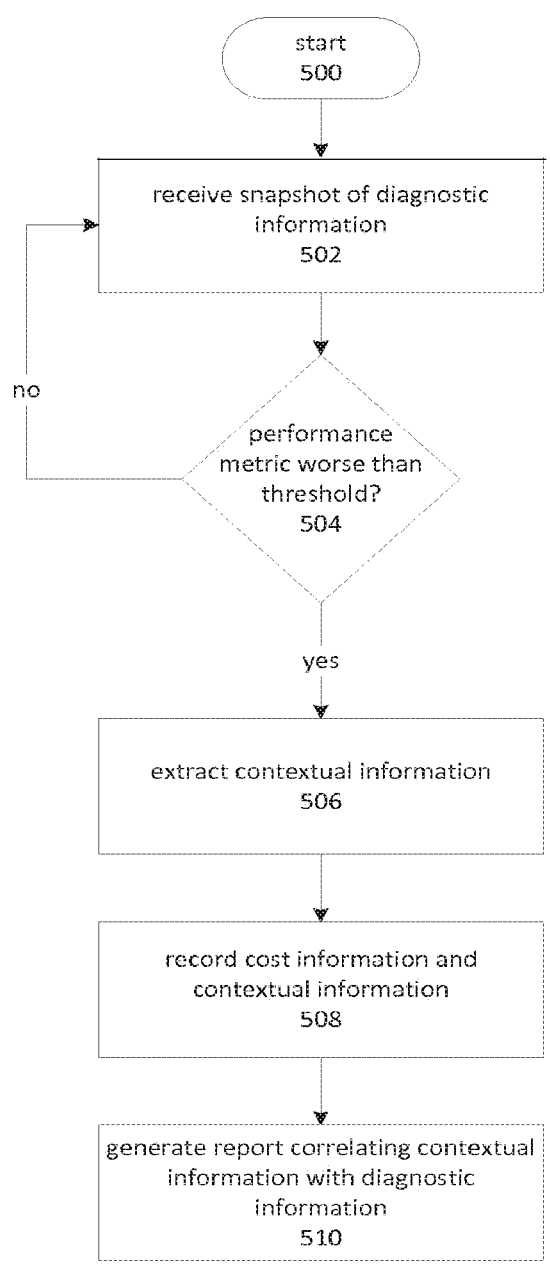
FIG. 5 is a flowchart depicting a process for recording performance information corresponding to the execution of a reformulated query.

A system configured to reformulate queries to include contextual information may be extended to record cost information corresponding to those queries. The system may be further configured to produce reports providing insight into web service invocations that are problematic due to excess impact on the performance or capacity of a database. FIG. 5 depicts an embodiment of a process for recording cost information for the reformulated queries and producing reports correlating between expensive database queries and the web service API invocations that caused them. Those of ordinary skill in the art will appreciate that FIG. 5 is illustrative of generalized concept related to a possible embodiment, and that some of the depicted operations may be modified, omitted, reordered or performed in parallel.

At operation 502, a snapshot of database performance metrics is received. In some embodiments, the snapshot may comprise an instantaneous view of currently executing queries and associated cost information. In other embodiments, a continuous log of server activity may be generated, such that each snapshot comprises cost information for the most recently executed query or queries.

At operation 504, which may be omitted, various performance metrics present in or derivable from the cost information may be examined. It may be advantageous to limit log entries and generated reports to a subset of queries having comparatively poor performance. Operation 504 therefore involves comparing query performance metrics against a threshold, and continuing to log and report on the query only if performance is worse than some threshold level. If performance is better than this threshold, operation 502 may be repeated until cost information for a poorly performing query is received.

Contextual information may be extracted from the cost information obtained for reformulated queries, as depicted by operation 506. Various approaches may be used to extract the information, such as parsing the query statement. The approach used generally would reflect the approach used to encode the information. For example, contextual information encoded based on position within a join or where clause would also be decoded based on position. In some embodiments, the column names or left-hand side of conditional statements may contain descriptions corresponding to the contextual information; these descriptions may be employed during extraction.

The cost and contextual information may be recorded at operation 508. The recorded information may comprise the text of the query, relevant performance metrics and contextual information regarding the corresponding web service invocation. The contextual information may include, for example, a customer identifier for the customer who invoked the web service API. In various embodiments, the cost information may be directly or indirectly written to a database, data warehouse or other repository, which may be advantageous because it facilitates subsequent queries over the cost and contextual information. In other embodiments, the data may be written to a log file for subsequent analysis. The cost and contextual information may be written to the same row as a means of recording the association between them. Various embodiments might also use primary and foreign key relationships, linked data structures and so forth.

Operation 510 depicts the generation of one possible report, which correlates contextual information with cost information. In an embodiment, the report comprises a listing of queries whose performance was worse than a threshold level, a customer identifier corresponding to the customer who invoked the web service API that led to the poorly performing query, and an invocation GUID corresponding to the particular invocation of the web service API. In another embodiment, cost information is summarized to report information on a per-customer identifier basis, so that each customer's total impact on database performance may be analyzed. In another embodiment, rows in the report are grouped by invocation GUID, so that a single row represents all of the costs associated with a single invocation. This type of report may be useful when a single invocation of a web service API results in numerous subsequent database queries.

FIG. 5B depicts an example of a report that may be generated by some embodiments. In addition, FIG. 5B is illustrative of further operations that may be performed on data that associates the invoking web service API with database cost. Those of ordinary skill in the art will appreciate that many other report types are possible. For example, a report might summarize the monetary cost of hosting an application programming interface, which may be useful for purposes such as capacity planning and forecasting. Other report types might be designed to allow for customers to focus their design and engineering efforts on code that inefficiently utilizes the capacity of the hosting services they are paying for.

Contextualized cost table 550 is depicted as a report associating cost information with contextual information describing the context in which the database cost was incurred. The context may involve web service API invocation, as well as various other situations in which database requests or queries are invoked. The contextualized cost table 550 may be defined as having a set of columns related to context as well as a set of columns related to the cost associated with the indicated context. Although depicted as a single table, various embodiments may utilize different structures. One example involves keeping a table primarily comprising cost information and a second table primarily comprising contextual information. The two tables may be related by a primary and foreign key relationship and joined as needed.

The contextualized cost table 550 comprises columns such as customer identifier 552, API 554, and invocation identifier 556 which relate to the context of the web service API invocation, or other event, that led to the cost expenditure. The table also comprises columns such as CPU 558 and elapsed time 560, which describe associated the cost expenditure.

Information in the contextualized cost table may be summarized. For example, rows 562 and 566 relate to the same customer identifier 552, API 554, and invocation 556, while row 564 describes an invocation of a different API by a different customer. The cost information pertaining to the same API invocation may be summarized to arrive at figures representative of the total cost of the invocation. This value may be utilized for various purposes, such as analysis, throttling and determining the cost of providing a customer with the web service.

If the values of the invocation identifier 556 in rows 562 and 566 were not equivalent, the values could not be summarized on a per-invocation basis. However, other summarizations would still be possible, such as an average cost across all "getSalesData" API invocations for individual customers, or an average across all customers.

Figure 6:
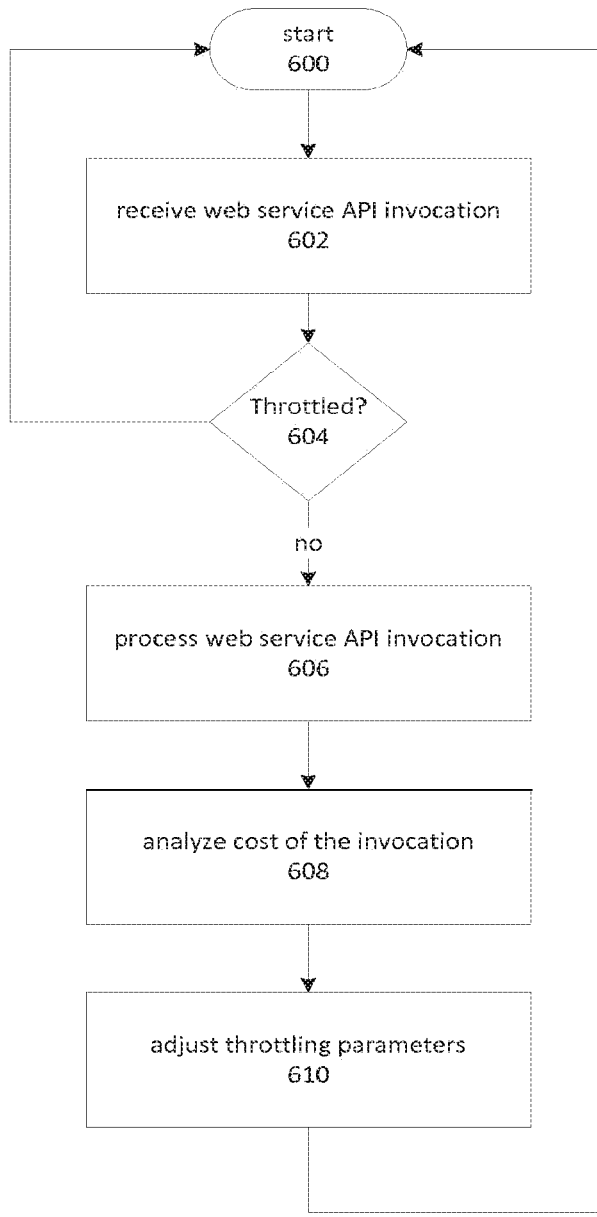
FIG. 6 is an flowchart depicting an embodiment for throttling web service API invocations based on the cost of prior invocations.

Embodiments of the present disclosure may also be employed to perform real-time monitoring and control of access to web services. One example, depicted in FIG. 6, involves using aspects of the present disclosure to throttle a customer's access to a web service API. Throttling may be used for a variety of purposes, including preventing a customer from exceeding a provisioned capacity. Capacity may be allocated to a customer based on an agreed payment plan, and accordingly it may be advantageous to ensure that the customer is not allowed to use the system beyond the level of service paid for. Throttling based on cost may also be used to ensure fairness between customers, or as a means of preventing resource starvation.

At operation 602, a web service API invocation is received, potentially accompanied by various parameters associated with the invocation. For example, a web service API named "getSalesData" might be accompanied by a parameter indicating a product to which the desired sales data would apply. It may be the case that certain parameter values, or combinations of values, are associated with a larger impact on database performance. Accordingly, it may be advantageous for some embodiments of a throttling mechanism to incorporate the supplied parameters in determining the expected cost of an operation and making throttling decisions.

At operation 604, the web service API may be throttled based on a predicted cost of the operation. Using aspects of the present disclosure, the predicted cost may be based at least in part on the operation's impact on database performance, utilization and capacity. Furthermore, aspects of the present disclosure may be employed to base the predicted cost at least in part on a particular customer's usage history, as applied to the web service API being invoked. In some embodiments, the predicted cost may be further refined according to the particular parameters accompanying the web service API invocation.

The predicted cost may be compared to a provisioned capacity to determine if the invocation should be throttled. Various techniques may be employed to determine the provisioned capacity. In some embodiments, the capacity may be expressed on a per-invocation basis. The expect cost of the operation may be compared to a threshold value, and if it exceeds it, the request may be throttled. This may result in certain operations being persistently throttled, which is desirable in some circumstances. In another embodiment, the expected cost may be subtracted from a balance figure, and the request throttled if the result is below a threshold level. In some embodiments, the balance figure may be periodically refreshed.

In an embodiment, the actual cost of an operation may be employed instead of a predicted cost. When an invocation is terminated for a reason other than throttling—for example when the web service API successfully completes—the cost of the operation may be calculated using techniques described herein. This cost value may be subtracted from the balance figure, and subsequent requests throttled while the balance figure is below a threshold value.

If a requested invocation is throttled, an indication may be sent to the customer process that invoked the web service API. Processing of the web service API may then terminate, and the depicted process may then be repeated upon receiving a further invocation of a web service request. If the requested invocation is not throttled, the web service API may be processed, as depicted by operation 606. As noted elsewhere in the present disclosure, contextual information may be associated with the path of execution at an early point in the processing of the web service API, so that it is available to subsequent code along the path of execution for use in reformulating database queries. Using aspects of the present disclosure, the performance impact of the reformulated database queries may be monitored and recorded.

Operation 608 involves analyzing the cost of the invocation. The cost, as well as any associated threshold and balance values, may be determined based on resources whose capacity is limited or for which controlled expenditure of the resource is desired. For example, cost may be expressed as some combination of CPU cycles, network bandwidth, disk capacity and so forth. As described herein, the cost may be calculated using cost information gathered for the database command and queries executed as a result of the web service API invocation. In some embodiments, additional cost figures may be included. This may, for example, include CPU cycles consumed executing the web service API code, storage capacity consumed and various other metrics.

Once the cost of the invocation has been measured, various throttling parameters may be adjusted at operation 610. This may include, for example, subtracting the calculated cost from a balance figure. In some embodiments, the current cost may be applied to an average or moving average of costs, and the figure used as a predicted cost for future throttling decisions.

Figure 7:
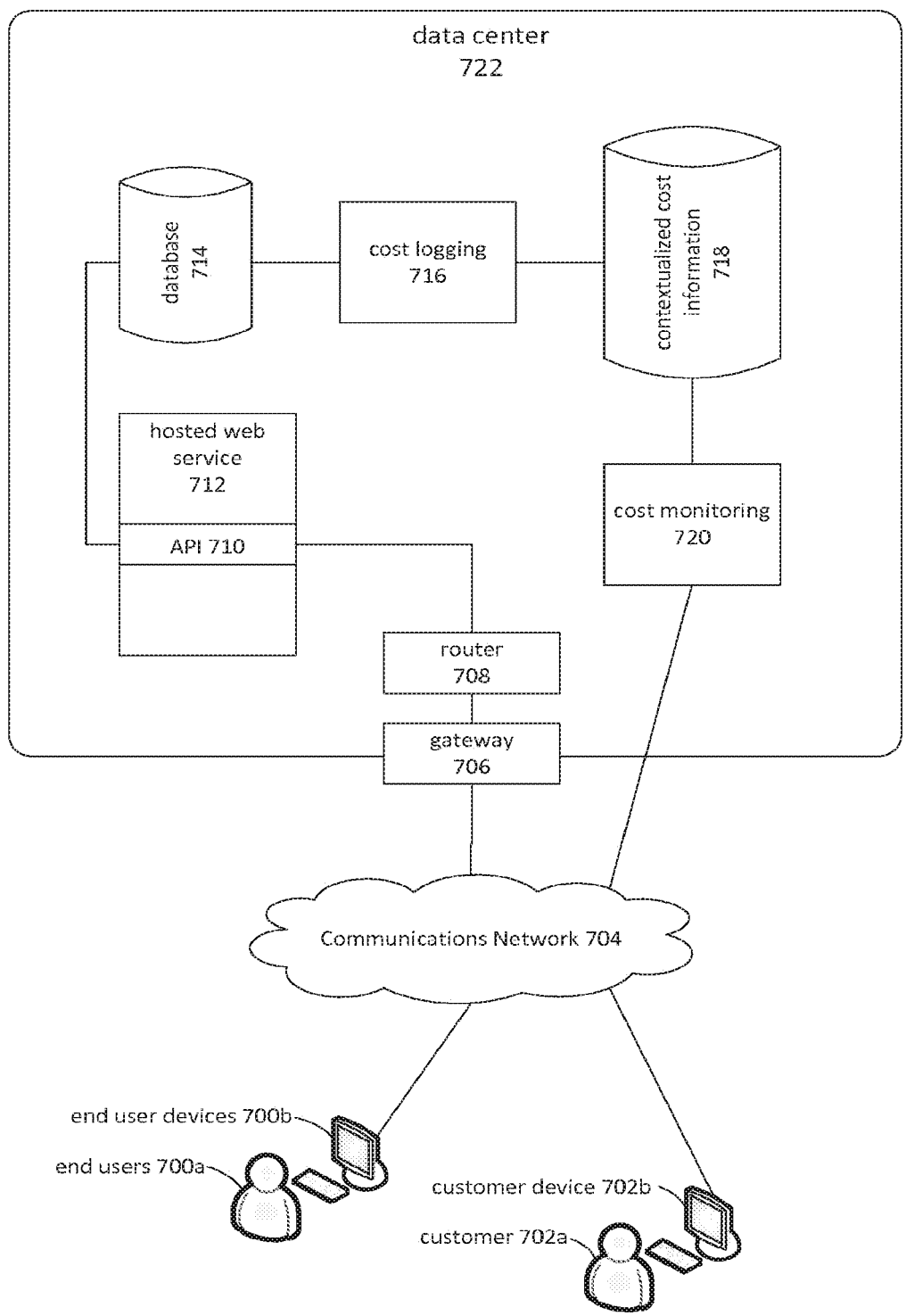
FIG. 7 is a block diagram depicting an example of a system for notifying a customer of a hosting service when cost expenditures exceed an allocated amount.

In an embodiment, cost measurements may be summarized on a per-customer basis to determine an appropriate cost level for providing web service APIs to the customer, or to notify customers when cost threshold are exceeded. FIG. 7 depicts an embodiment of a system that performs these functions.

Customer 702a may have a contractual relationship with an operator of data center 722 to host web service 712. The operator's remuneration for providing the service may be based at least in part on the performance, capacity or utilization of database 714. Various administrative and cost-related functions may be performed by customer 702a interacting with the user interface of customer device 702b. The user interface of customer device 702b may, for example, display summary cost statistics for hosted web service 712, and specific web service API's such as API 710.

Customer 702a may invoke API 710 of hosted web service 712, communicating with data center 722 through, for example, communications network 704, gateway 706 and router 708. In addition, end users 700a may invoke API 710 on hosted web service 712, by using end user devices 700b connected to hosted web service 712 through communications network 704, gateway 706 and router 708. Communications network 704 may comprise various networks such as the Internet or an intranet. In some embodiments, customer device 702b and end user device 700b may communicate with data center 722 through separate network paths.

When API 710 receives an invocation, contextual information regarding the invoking user may be recorded. For example, it may be advantageous to distinguish between invocations originating from end users 700a and those originating from customer 702a. When a web service API 710 invocation originates from end users 700a or end user devices 700b, it may also be advantageous to record the customer 702a associated with the request. In this manner, figures may be calculated regarding the total cost of providing hosted web service 712 to end users 700a on behalf of customer 702a.

When API 710 is invoked, processing of the invocation may result in one or more subsequent queries involving databases such as depicted database 714. In various embodiments, multiple databases may be involved. The cost of providing API 710 and hosted web service 712 may be calculated, using the associated contextual information, to reflect the total cost across all databases involved. The cost calculation may also factor in other resources, using techniques consistent with the present disclosure.

A cost logging facility 716 may be configured to obtain diagnostic and performance information related to queries executed on database 714. As used herein, the term facility refers to a process, module, library or other forms of executing or executable code, circuitry and the like. Cost logging facility 716 may extract contextual information encoded or embedded in the information and then record it, along with the extracted performance and diagnostic information. This contextualized cost information 718 may be stored, for example, in a database table accessible to cost monitoring facility 720.

Cost monitoring facility 720 may analyze the contextualized cost information 718 to determine summary data for invocations made against hosted web service 712, either directly by customer 702a or by end users 700a. Furthermore, a running total of costs incurred may be calculated based on a grouping of costs associated with a set of contextual information. If the total of cost incurred exceeds a threshold amount, cost monitoring facility 720 may notify the operator of the cost overage. This may be advantageous when customer 702a is being charged a fixed fee. In other cases, customer 702a may be charged based on cost incurred. If so, cost monitoring facility 720 may send various notifications to customer 702a as the running total of costs incurred exceeds various thresholds. A user interface accessible through customer device 702b may allow customer 702a to pay additional funds, authorize an overage, request that the service throttle above an indicated threshold and so forth.

It should be noted that although cost monitoring facility 720 may access the query language statements issued to database 714 without having access to the data returned by executing the query. In other words, the integrity and privacy of the actual query results are kept private to the original client that issued the query.

In an embodiment, cost monitoring may involve using cost information to perform capacity management and planning. The cost of hosting a service may be considered by the hosting provider when making decisions about equipment purchases, maintenance and infrastructure design. The information may also be used by the customer for purposes such as purchasing additional capacity, budgeting and so forth.

Cost information, including dollar figures, may also be used for various engineering and software architecture design purposes. High-cost services may, for example, be examined for efficiency improvements. This information may be useful to both the hosting provider and the customer. In an embodiment, a report summarizing high-cost services may be sent to the customer, hosting provider or other parties involved in designing, maintaining or operating the high-cost services.

In an embodiment, the usage pattern of a customer may be monitored over time to detect various conditions. These conditions include usage patterns with pronounced spikes, cost expenditures concentrated during a particular time frame, deviations from prior usage patterns and so forth. Decisions regarding fairness, load balancing, detecting denial of service attacks and so forth may be based on analysis of these usage patterns. When unusual or problematic usage patterns are detected, it may be advantageous to generate a report describing the usage pattern along with descriptions of corresponding web services, APIs and so forth.

Figure 8:
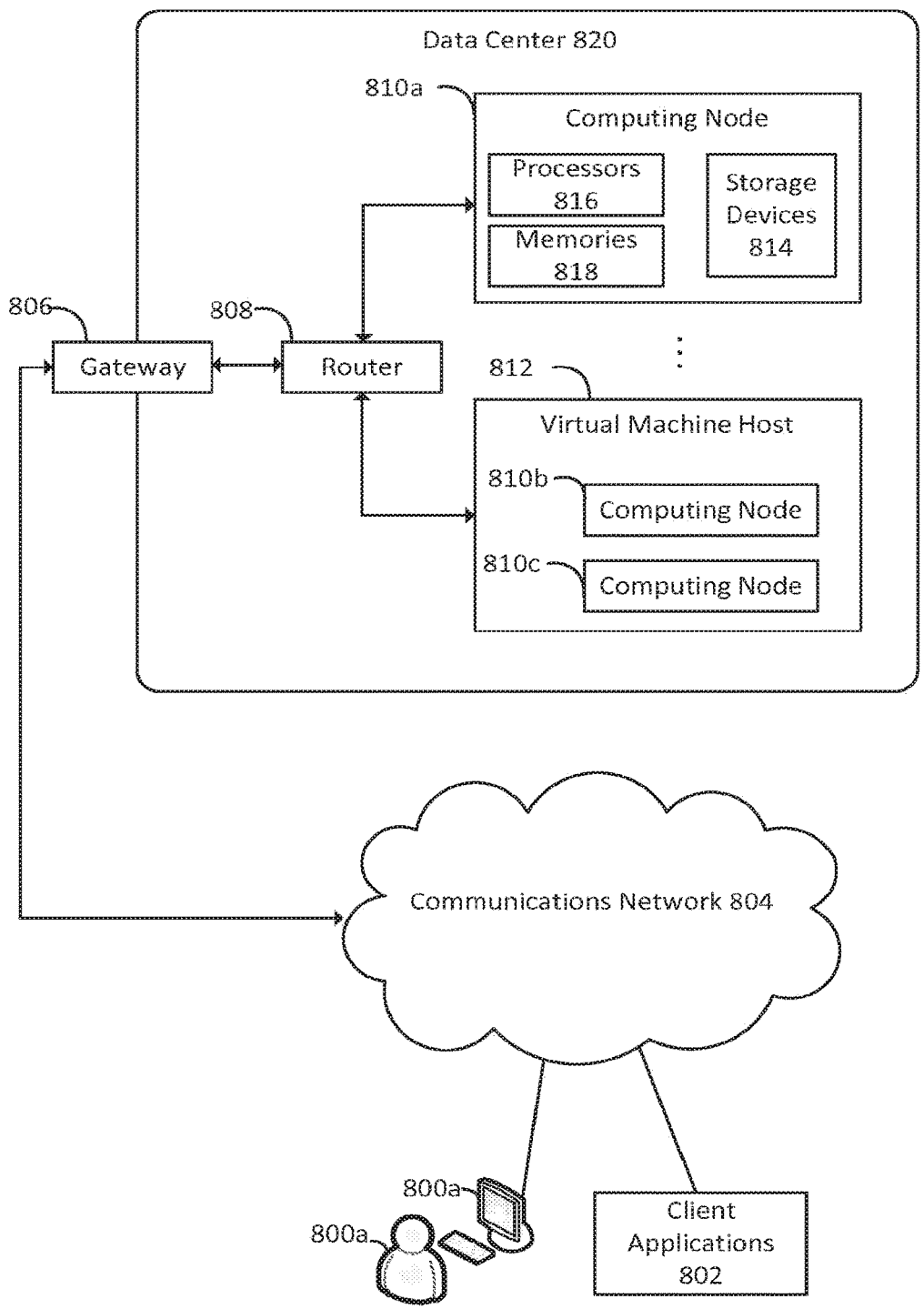
FIG. 8 is a block diagram depicting an example of a distributed computing environment on which aspects of the present disclosure may be practiced.

FIG. 8 is a diagram depicting an example of a distributed computing environment on which aspects of the present disclosure may be practiced. Various users 800a may interact in various ways with applications operating on computing device 800a, to communicate over communications network 804 with processes executing on various computing nodes 810a, 810b and 810c within a data center 820. Alternatively, client applications 802 may communicate without user intervention. Communications network 804 may comprise any combination of communications technology, including the Internet, wired and wireless local area networks, fiber optic networks, satellite communications and so forth. Any number of networking protocols may be employed.

Communication with processes executing on the computing nodes 810a, 810b and 810c, operating within data center 820, may be provided via gateway 806 and router 808. Numerous other network configurations may also be employed. Although not depicted in FIG. 8, various authentication mechanisms, web service layers, business objects or other intermediate layers may be provided to mediate communication with the processes executing on computing nodes 810a, 810b and 810c. Some of these intermediate layers may themselves comprise processes executing on one or more of the computing nodes. Computing nodes 810a, 810b and 810c, and processes executing thereon, may also communicate with each other via router 808. Alternatively, separate communication paths may be employed. In some embodiments, data center 820 may be configured to communicate with additional data centers, such that the computing nodes and processes executing thereon may communicate with computing nodes and processes operating within other data centers.

Computing node 810a is depicted as residing on physical hardware comprising one or more processors 816, one or more memories 818 and one or more storage devices 814. Processes on computing node 810a may execute in conjunction with an operating system or alternatively may execute as a bare-metal process that directly interacts with physical resources such as processors 816, memories 818 or storage devices 814.

Computing nodes 810b and 810c are depicted as operating on virtual machine host 812, which may provide shared access to various physical resources such as physical processors, memory and storage devices. Any number of virtualization mechanisms might be employed to host the computing nodes.

The various computing nodes depicted in FIG. 8 may be configured to host web services, database management systems, business objects, monitoring and diagnostic facilities and so forth. A computing node may refer to various types of computing resources, such as personal computers, servers, clustered computing devices and so forth. When implemented in hardware form, computing nodes are generally associated with one or more memories configured to store computer-readable instructions, and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments and so forth. A virtualization-based computing node may have virtualized access to hardware resources, as well as non-virtualized access. The computing node may be configured to execute an operating system, as well as one or more application programs. In some embodiments, a computing node might also comprise bare-metal application programs.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A non-transitory computer-readable storage medium having stored thereon instructions that, upon execution by a computing device, cause the computing device to at least:
    initiate processing of an invocation of an application programming interface;
    associate a first identifier with a thread of execution performing at least one function of the application programming interface;
    create a second query from a first query, the first query corresponding to performing the at least one function of the application programming interface, the second query comprising the first identifier, the second query configured to produce a same result upon execution as the first query; and
    cause the second query to be executed.

2. The computer-readable medium of claim 1, wherein the first identifier is associated with the thread of execution by storing a record associated with the identifier in thread local storage.

3. The computer-readable medium of claim 1, wherein the thread of execution invokes a call level interface using the first query as a parameter and the second query is created subsequent to invoking the call level interface.

4. The computer-readable medium of claim 1, wherein the second query comprises a join on an empty table.

5. The computer-readable medium of claim 1, wherein the second query comprises a where clause containing an always true condition.

6. The computer-readable medium of claim 1, wherein the second query comprises one of a comment, pragma, message, or inoperative element.

7. The computer-readable medium of claim 1, further comprising making a request to invoke a second application programming interface, the request comprising the first identifier.

8. A method comprising:
    initiating processing of an invocation of an application programming interface;
    associating a first identifier with a thread of execution performing at least one function of the application programming interface;
    creating a second query from a first query, the first query corresponding to performing the at least one function of the application programming interface, the second query comprising the first identifier, the second query configured to produce a same result upon execution as the first query; and
    causing the second query to be executed.

9. The method of claim 8, further comprising:
    calculating a metric based at least in part on the first identifier.

10. The method of claim 9, further comprising:
    determining to throttle a second invocation of the application programming interface, the determining based at least in part on the metric.

11. The method of claim 10, wherein the determining is based at least in part on impact of the invocation on a database.

12. The method of claim 9, further comprising:
identifying a cost overage associated with invocations of the application programming interface, the identifying based at least in part on the metric; and
sending a notification indicative of the cost overage.

13. The method of claim 8, wherein the thread of execution invokes a call level interface using the first query as a parameter and the second query is created subsequent to invoking the call level interface.

14. The method of claim 8, further comprising making a request to invoke a second application programming interface, the request comprising the first identifier.

15. A system comprising:
a database;
a computing node that at least:
initiates processing of an invocation of an application programming interface;
associates a first identifier with a thread of execution performing at least one function of the application programming interface;
creates a second query of the database from a first query of the database, the first query corresponding to performing the at least one function of the application programming interface, the second query comprising the first identifier, the second query configured to produce a same result upon execution as the first query; and
causes the second query to be executed.

16. The system of claim 15, wherein the computing node at least:
associates the first identifier with the thread of execution by storing a record associated with the identifier in thread local storage.

17. The system of claim 15, wherein the second query comprises a where clause containing an always true condition.

18. The system of claim 15, wherein the second query comprises one of a comment, pragma, message, or inoperative element.

19. The system of claim 15, wherein the computing node at least:
requests invocation of a second application programming interface, the request comprising the first identifier.

20. The system of claim 15, wherein the computing node at least:
calculates a metric based at least in part on the first identifier; and
determines, based at least in part on the metric, to throttle a second invocation of the application programming interface.

* * * * *